(12) United States Patent
Germer et al.

(10) Patent No.: US 11,099,634 B2
(45) Date of Patent: Aug. 24, 2021

(54) MANIPULATION OF VIRTUAL OBJECTS USING A TRACKED PHYSICAL OBJECT

(71) Applicant: Apple Inc., Cupertino, CA (US)

(72) Inventors: Austin C. Germer, Novato, CA (US); Ryan S. Burgoyne, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/745,472

(22) Filed: Jan. 17, 2020

(65) Prior Publication Data

US 2020/0241629 A1 Jul. 30, 2020

Related U.S. Application Data (60) Provisional application No. 62/796,706, filed on Jan. 25, 2019.

(51) Int. Cl.
*G06F 3/01* (2006.01)
*G06F 3/0346* (2013.01)
*G06F 3/03* (2006.01)
*G09G 5/38* (2006.01)

(52) U.S. Cl.
CPC ............ *G06F 3/011* (2013.01); *G06F 3/0304* (2013.01); *G06F 3/0346* (2013.01); *G09G 5/38* (2013.01); *G09G 2340/0464* (2013.01); *G09G 2340/0492* (2013.01); *G09G 2354/00* (2013.01)

(58) Field of Classification Search
CPC ...................................................... G06F 3/011
USPC ....................................................... 345/156
See application file for complete search history.

(56) References Cited

U.S. PATENT DOCUMENTS

| | | | |
|---|---|---|---|
| 2015/0331576 A1 | 11/2015 | Piya et al. | |
| 2016/0189426 A1* | 6/2016 | Thomas | G06F 3/011 |
| | | | 345/633 |
| 2016/0328887 A1 | 11/2016 | Elvezio et al. | |
| 2017/0244811 A1* | 8/2017 | Mckenzie | G02B 27/017 |
| 2017/0316610 A1 | 11/2017 | Lin et al. | |

* cited by examiner

*Primary Examiner* — Long D Pham
(74) *Attorney, Agent, or Firm* — Thompson Hine LLP (57) ABSTRACT

In one implementation, a method of manipulating virtual objects using tracked physical objects is disclosed. The method involves presenting content including a virtual object and a virtual representation of a proxy device physically unassociated with an electronic device on a display of the electronic device. Input is received from the proxy device using an input device of the proxy device that represents a request to create a fixed alignment between the virtual object and the virtual representation in a three-dimensional ("3-D") coordinate space defined for the content. The fixed alignment is created in response to receiving the input. A position and an orientation of the virtual object in the 3-D coordinate space is dynamically updated using position data that defines movement of the proxy device in the physical environment.

19 Claims, 6 Drawing Sheets

902 Presenting content including a virtual object and a virtual representation of a proxy device physically unassociated with an electronic device on a display of the electronic device

904 Receiving, from the proxy device using an input device of the proxy device, input representing a request to create a fixed alignment between the virtual object and the virtual representation in a three-dimensional ("3-D") coordinate space defined for the content

906 Creating the fixed alignment in response to receiving the input

908 Dynamically updating a position and an orientation of the virtual object in the 3-D coordinate space using position data that defines movement of the proxy device in a physical environment

MANIPULATION OF VIRTUAL OBJECTS USING A TRACKED PHYSICAL OBJECT

CROSS-REFERENCE TO RELATED APPLICATIONS

This Application claims the benefit of U.S. Provisional Application Ser. No. 62/796,706 filed Jan. 25, 2019, which is incorporated herein in its entirety.

TECHNICAL FIELD

The present disclosure generally relates to systems, methods, and devices for presenting content on a display of an electronic device, and in particular, to manipulating virtual objects using a tracked physical object while presenting content on a display of an electronic device.

BACKGROUND

Various electronic devices exist, such as head-mound devices (also known as headsets and HMDs), with displays that present users with a computer-generated reality (CGR) environment in which they may be fully immersed in a surrounding physical environment, fully immersed in a virtual reality environment comprising virtual objects, or anywhere in between. While direct manipulation of physical objects in the surrounding physical environment is available to users naturally, the same is not true for virtual objects in the CGR environment. Lacking a means to directly interact with virtual objects presented to a user as part of a CGR environment limits a degree to which the virtual objects are integrated into the CGR environment. Thus, it may be desirable to provide users with a means of directly manipulating virtual objects presented as part of CGR environments.

SUMMARY

Various implementations disclosed herein include devices, systems, and methods of manipulating virtual objects using a tracked physical object while presenting content on a display of an electronic device. In one implementation, a method involves presenting content including a virtual object and a virtual representation of a proxy device physically unassociated with an electronic device on a display of the electronic device. The proxy device includes an input device disposed on an external facing surface of a case that defines peripheral boundaries of the proxy device. The case is symmetrical with respect to each axis of a proxy device reference frame fixed at a center of the proxy device. Input is received from the proxy device using the input device that represents a request to create a fixed alignment between the virtual object and the virtual representation in a three-dimensional ("3-D") coordinate space defined for the content. The fixed alignment is created in response to receiving the input. A position and an orientation of the virtual object in the 3-D coordinate space is dynamically updated using position data that defines movement of the proxy device in the physical environment.

In another implementation, a non-transitory computer-readable storage medium stores program instructions computer-executable on a computer to perform operations. The operations include presenting content including a virtual object and a virtual representation of a proxy device physically unassociated with an electronic device on a display of the electronic device. The proxy device includes an input device disposed on an external facing surface of a case that defines peripheral boundaries of the proxy device. The case is adapted for manipulation by a grasping force applied by a hand of a user on diametrically opposing surface areas of the case and at another surface area of the case that positioned orthogonal to the diametrically opposing surface areas. Input is received from the proxy device using the input device that represents a request to create a fixed alignment between the virtual object and the virtual representation in a three-dimensional ("3-D") coordinate space defined for the content. The fixed alignment is created in response to receiving the input. A position and an orientation of the virtual object in the 3-D coordinate space is dynamically updated using position data that defines movement of the proxy device in the physical environment.

In another implementation, a proxy device includes a case that defines peripheral boundaries of the proxy device and an input device. The case is symmetrical with respect to each axis of a proxy device reference frame fixed at a center of the proxy device. The input device is disposed on an external facing surface of the case and is configured to receive inputs representing requests for manipulations of a virtual object that is included in content presented on a display of an electronic device that is physically unassociated with the proxy device via a virtual representation of the proxy device in the content. Movement of the proxy device in a physical environment translates into movement of the virtual representation in a three-dimensional ("3-D") coordinate space defined for the content.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
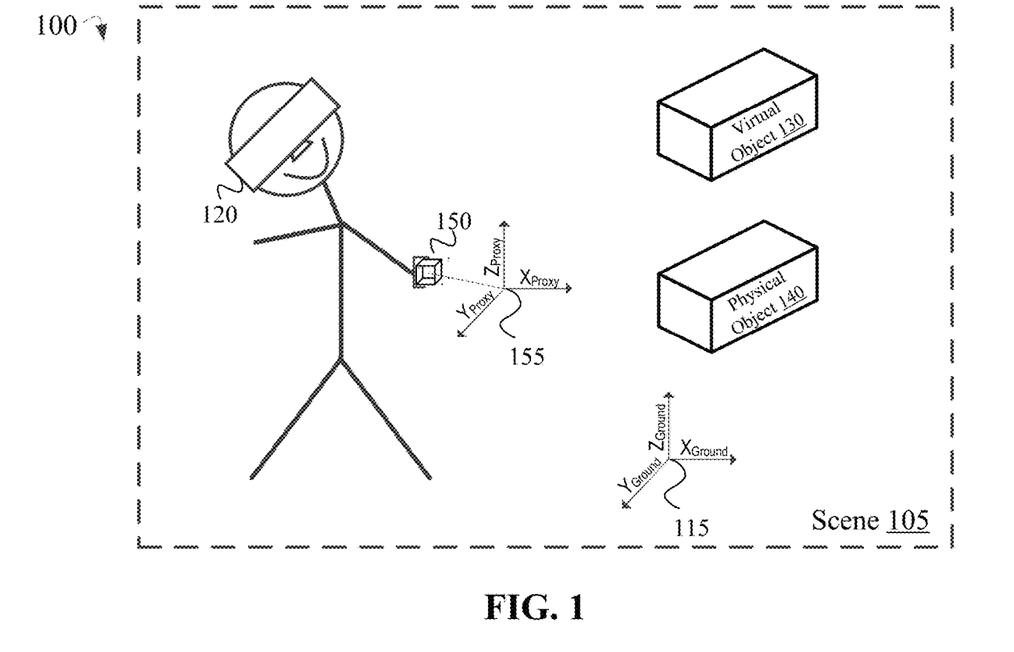
FIG. 1 is a block diagram of an example operating environment, in accordance with some implementations.

Referring to FIG. 1, an example operating environment 100 for implementing aspects of the present disclosure is illustrated and designated generally 100. In general, operating environment 100 illustrates an electronic device 120 configured to present a user with content corresponding to a computer-generated reality environment. As used herein, a physical environment refers to a world that individuals can sense and/or with which individuals can interact without assistance of electronic systems. Physical environments (e.g., a physical forest) include physical elements (e.g., physical trees, physical structures, and physical animals). Individuals can directly interact with and/or sense the physical environment, such as through touch, sight, smell, hearing, and taste.

A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Proxy device 150 is an example of one type of input mechanism that may be used to manipulate or otherwise interact with virtual objects (e.g., virtual object 130) as part of an CGR environment. As shown in FIG. 1, proxy device 150 is an example of an input mechanism that is physically unassociated with electronic device 120. In accordance with implementations of the present disclosure, one aspect of manipulating virtual objects with proxy device 150 involves creating a fixed alignment between a virtual object and a virtual representation of proxy device 150. Upon creating such fixed alignments, proxy device 150 serves as a proxy in a physical environment for virtual objects in an CGR environment in that physical movement of proxy device 150 directly translates into computer-created movement of the virtual objects. In one implementation, proxy device 150 includes a haptic device configured to actuate when proxy device 150 receives feedback signals associated with manipulations of virtual objects (e.g., virtual object 130).

Figure 2:
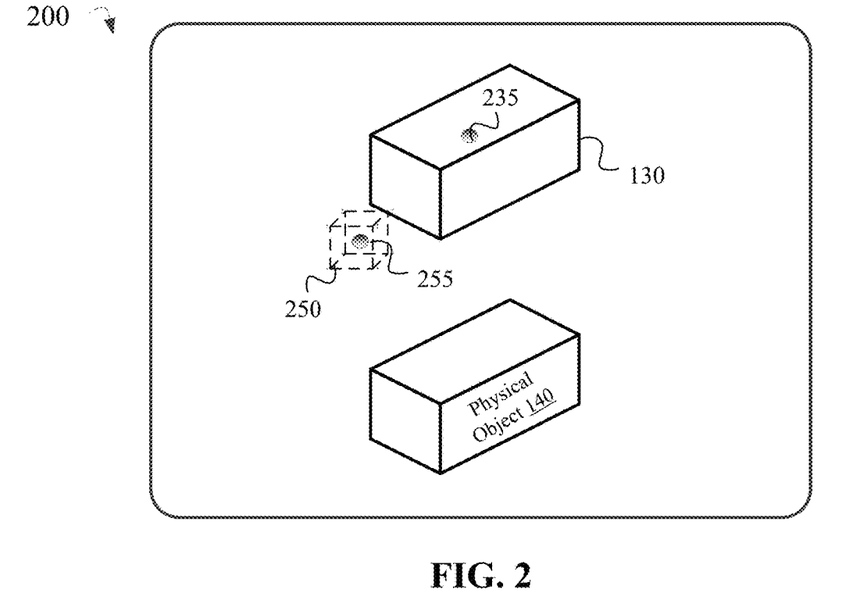
FIG. 2 illustrates an example of presenting content representing a view of a computer-generated reality environment on a display of an electronic device while the electronic device is located in a physical environment associated with the operating environment illustrated in FIG. 1.

FIG. 2 illustrates an example of presenting content 200 representing an CGR environment on a display (e.g., the one or more displays 1006 of FIG. 10) of electronic device 120. Content 200 generally corresponds to a view of the CGR environment that a user of electronic device 120 may perceive before manipulating virtual object 130 using proxy device 150. As shown in FIG. 2, content 200 includes content corresponding to virtual object 130 and content depicting physical object 140. While the user may alter a pose (e.g., a position and/or an orientation) of physical object 140 in the physical environment through direct or indirect physical interaction, the same is not true for virtual object 130. In order to alter a pose of virtual object 130, a proxy in the CGR environment is involved in transferring physical interaction from a physical environment into simulated interaction in the CGR environment represented by content 200. To that end, content 200 further includes a computer-created sensory representation of proxy device 150, which is depicted in FIG. 2 as virtual representation 250, to serve as that proxy in the CGR environment.

In general, physical movement of proxy device 150 in the physical environment (e.g., scene 105) directly translates into simulated (or virtual) movement of virtual representation 250 in the CGR environment. Stated differently, physical movement of proxy device 150 that changes of a pose (e.g., a position and/or an orientation) of proxy device 150 in the physical environment also changes a pose of virtual representation 250 in a three-dimensional ("3-D") coordinate space of the CGR environment. The simulated movement that physical movement of proxy device 150 imparts onto virtual representation 250 may also translate into simulated movement of other virtual objects in the CGR environment by creating a fixed alignment between virtual representation 250 and a virtual object.

By way of example, an CGR environment module (e.g., CGR environment module 1040 of FIG. 10) of electronic device 120 may present content 200 on a display of electronic device 120. While presenting content 200, an input representing a request to create a fixed alignment between virtual object 130 and virtual representation 250 may be received from a user of electronic device 120. In one implementation, the input is received from proxy device 150 when at least a subset of virtual representation 250 overlaps a location on the display occupied by virtual object 130, as shown in FIG. 2. In one implementation, the input is received from proxy device 150 when an overlap between virtual representation 250 and virtual object 130 is absent on the display.

To receive such input from the user, proxy device 150 includes an input device disposed on an externally facing surface of a case that defines peripheral boundaries of proxy device 150. Examples of such input devices and cases are discussed in greater detail below with respect to FIGS. 7 and 8. Upon receiving the input from the user, proxy device 150 sends the input to the CGR environment module via a data obtaining unit (e.g., data obtaining unit 1042 of FIG. 10) of electronic device 120 for further processing. In response to receiving the input, an CGR presenting unit (e.g., CGR presenting unit 1044 of FIG. 10) of the CGR environment module creates the fixed alignment between virtual object 130 and virtual representation 250 on the display.

Figure 4:
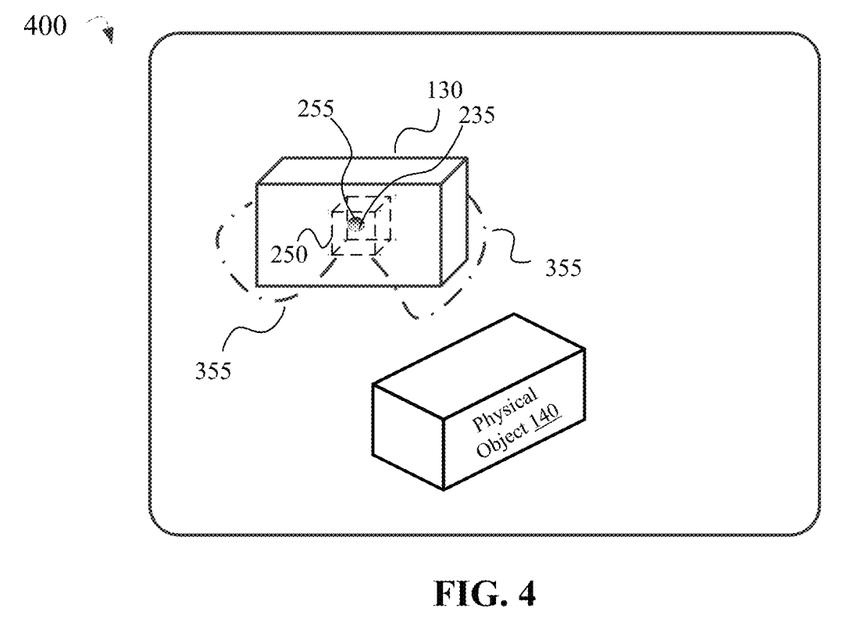
FIG. 4 illustrates an example of updating the content illustrated in FIG. 2 to create a fixed alignment between a virtual object and a virtual representation of a tracked physical object.

Creating a fixed alignment between a virtual object and a virtual representation of a proxy device generally involves transitioning the virtual object from a pre-alignment pose to a post-alignment pose. A comparison between FIGS. 2 and 4 illustrates one example of that transition. In this example, the respective positions and orientations of virtual object 130 and virtual representation 250 in content 200 are different when virtual object 130 is in a pre-alignment pose illustrated in FIG. 2. To create the fixed alignment illustrated in FIG. 4, the CGR presenting unit determines display coordinates that define an anchor point 255 of virtual representation 250 in a 3-D coordinate space of the CGR environment. In one implementation, the display coordinates defining anchor point 255 of virtual representation 250 is based on a proxy reference frame 155 fixed at a center of proxy device 150 in the physical environment. The CGR presenting unit then overwrites display coordinates defining an anchor point 235 of virtual object 130 in the 3-D coordinate space with the display coordinates corresponding to anchor point 255 to generate content 400. As a result, the respective positions and orientations of virtual object 130 and virtual representation 250 coincide after virtual object 130 is transitioned to the post-alignment pose illustrated in FIG. 4.

By way of example, virtual object 130 and virtual representation 250 are depicted as a rectangular prism and a cube, respectively in FIGS. 2 and 4. In this example, when virtual object 130 is repositioned into the post-alignment pose shown in FIG. 4, edges of the rectangular prism (representing virtual object 130) and the cube (representing virtual representation 250) are parallel. This example illustrates that in one implementation, a case of proxy object 150 may be symmetrical with respect to one or more axes of a device reference frame (e.g., device reference frame 730 of FIG. 7) fixed at a center of proxy device 150. In response to receiving a request to create the fixed alignment, the CGR presenting unit may snap an axis of virtual object 130 to a directional vector of virtual representation 250 corresponding to an axis of proxy device 150 based on proximity. That is, in this example, the CGR presenting unit creates the fixed alignment between virtual object 130 and virtual representation 250 by aligning the respective anchor points (anchor point 235 and anchor point 255) and snapping a closest match between each axis of proxy device 150 (corresponding to a directional vector of virtual representation 250) and each axis of virtual object 130 within the CGR environment. In doing so, the fixed alignment between virtual object 130 and virtual representation 250 is created without proxy device 150 having pre-defined forward/left/right/rearward directions.

While the CGR presenting unit uses the respective anchor points of virtual object 130 and virtual representation 250 to create the fixed alignment in this example, one skilled in the art will recognize that other implementations are not so limited. In some implementations, attachment properties of virtual object 130 specify other ways of creating the fixed alignment between virtual object 130 and virtual representation 250. As an example, the attachment properties of virtual object 130 may specify that creating the fixed alignment includes snapping a particular surface (e.g., a bottom surface) of virtual object 130 to a particular location of virtual representation 250. If proxy device 150 is implemented using proxy device 700 of FIG. 7 in this example, the particular location of virtual representation 250 may correspond to a horizontal surface (e.g., surface 710C) of the proxy device in the physical environment (e.g., scene 105). In one implementation, source data for rendering the virtual object defines the attachment properties of the virtual object. In one implementation, rules included in computer-executable program instructions corresponding to the CGR presenting unit defines the attachment properties of the virtual object.

Figure 3:
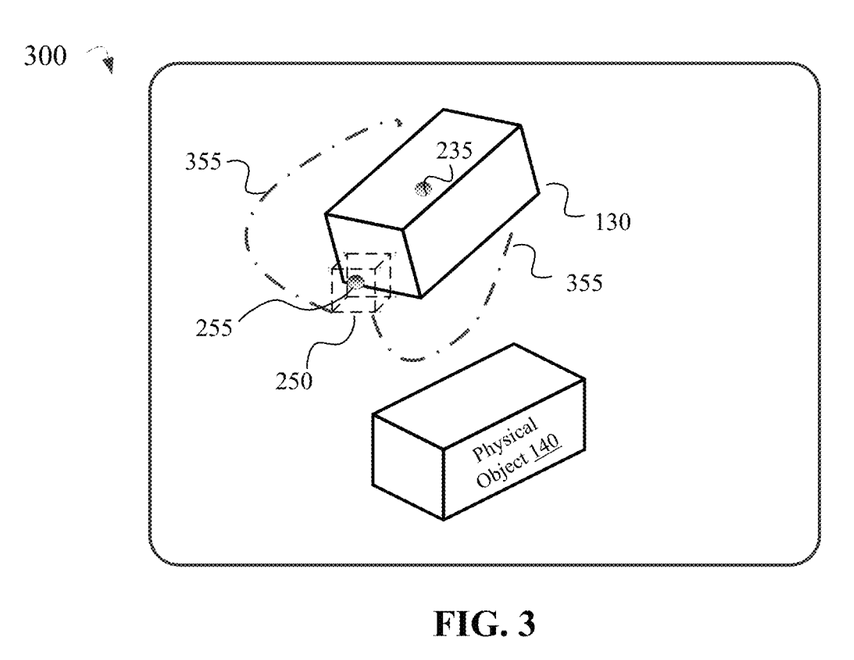
FIG. 3 illustrates an example of updating the content illustrated in FIG. 2 with visual feedback associated with a virtual representation of a tracked physical object to interact with virtual objects in the computer-generated reality environment.

In some implementations, visual feedback associated with a virtual representation may be used to mitigate any perception of unnatural movements by a user as a virtual object transitions from a pre-alignment pose to a post-alignment pose. Turning to FIG. 3, one example of such visual feedback is illustrated by visual feedback elements 355. Content 300 represents a view of the CGR environment that is presented on the display of electronic device 120 between content 200 and content 400. A comparison between FIGS. 2-4 illustrates that the visual feedback elements 355 associated with virtual representation 250 interact with virtual object 130 to gradually transition virtual object 130 from the pre-alignment pose of FIG. 2 to the post-alignment pose of FIG. 4.

Figure 5:
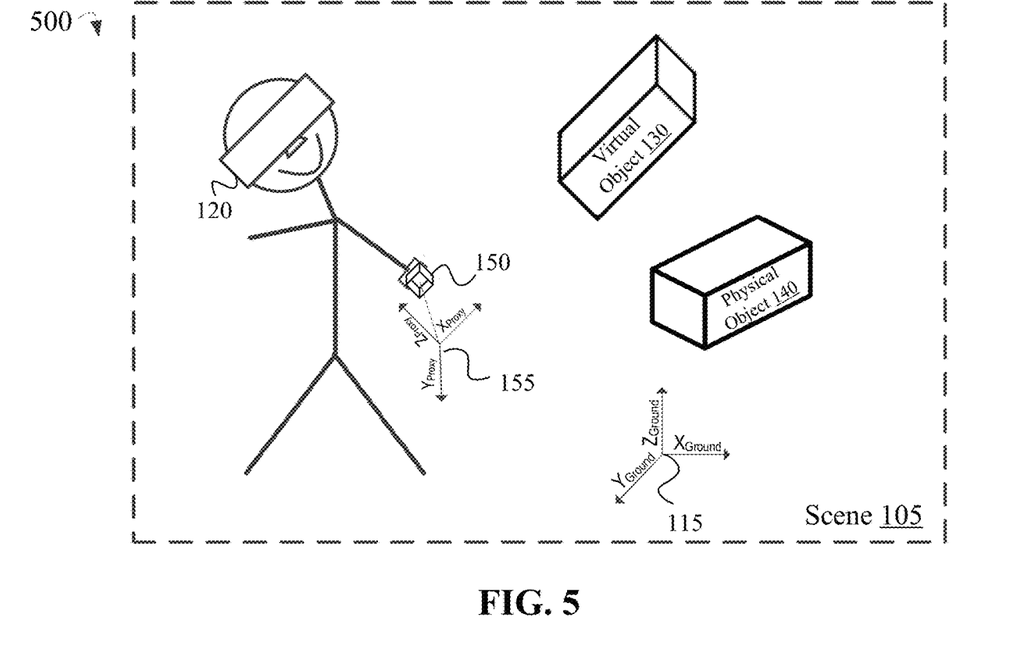
FIG. 5 is a block diagram of the example operating environment illustrated in FIG. 1 following physical movement of a tracked physical object in a physical environment.
Figure 6:
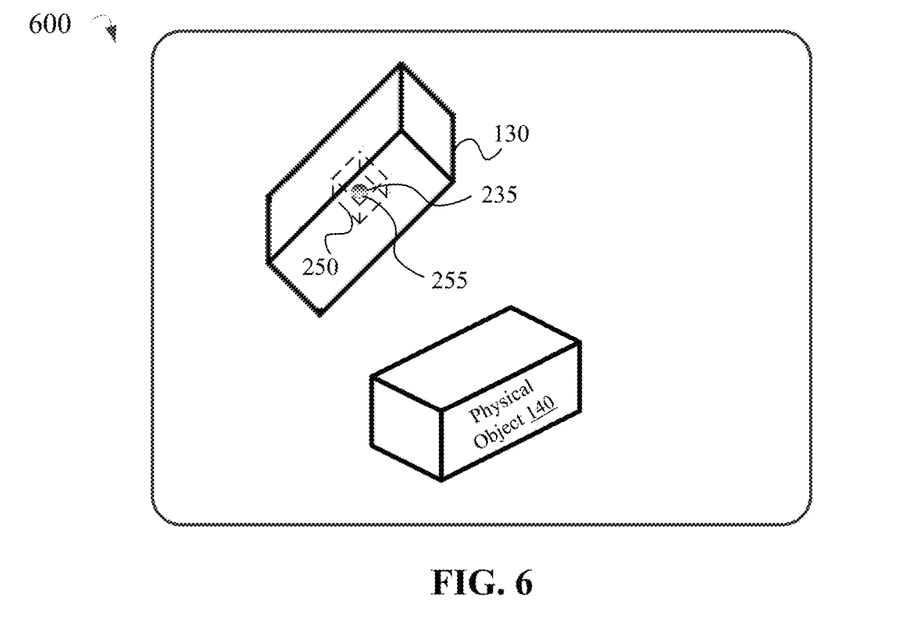
FIG. 6 illustrates an example of dynamically updating the content of FIG. 4 in response to the physical movement of the tracked physical object in the physical environment.

As discussed above, any simulated movement that physical movement of proxy device 150 imparts onto virtual representation 250 may also translate into simulated movement of other virtual objects in the CGR environment by creating a fixed alignment between virtual representation 250 and a virtual object. To illustrate such translation of simulated movement, FIG. 5 depicts proxy device 150 while content 400 is presented on the display of electronic device 120. A comparison between FIGS. 1 and 5 shows that the user of electronic device 120 has modified a pose of proxy device 150 in the physical environment. As illustrated in FIG. 6, the CGR presenting unit of electronic device 120 dynamically updated a pose of virtual representation 250 in the CGR environment to reflect that pose modification of proxy device 150 in the physical environment. FIG. 6 also illustrates that the CGR presenting unit of electronic device 120 dynamically updated a pose of virtual object 130 in the CGR environment to reflect that pose modification of proxy device 150 in the physical environment because of its fixed alignment with virtual representation 250.

In various implementations, the CGR presenting unit dynamically updates a pose of virtual object 130 or virtual representation 250 in the CGR environment to reflect any pose modification of proxy device 150 using position data that defines movement of proxy device 150 in the physical environment. The position data may define translational movement of proxy device 150 in the physical environment, rotational movement of proxy device 150 in the physical environment, or a combination thereof. Such position data may be obtained using any position tracking technique known to one skilled in the art. For example, the position data may be obtained using inertial data, image data, or a combination thereof.

In one implementation, the inertial data is obtained using an inertial measurement unit ("IMU") of proxy device 150. Generally, an IMU is a computing device that provides inertial data by sampling signals generated by one or more sensors of the IMU. The one or more sensors may include: one-to-tri-axial accelerometers for measuring changes in velocity along one to three axes, one-to-tri-axial axis gyroscopes for measuring angular velocity about one to three axes, one-to-tri-axial magnetometers for measuring information regarding magnetic fields relative to one to three axes, a barometric pressure sensor for measuring atmospheric pressure, and the like.

In one implementation, the image data depicts a plurality of optical sources configured to emit light. In one implementation, the plurality of optical sources are disposed on an externally facing surface of proxy device 150 at known locations relative to a proxy device reference frame (e.g., proxy device reference frames 155 and 730 of FIGS. 1 and 7, respectively). In one implementation, the plurality of optical sources are disposed on an externally facing surface of electronic device 120 at known locations relative to a device reference frame (e.g., device reference frame 125 of FIG. 1).

Figure 7:
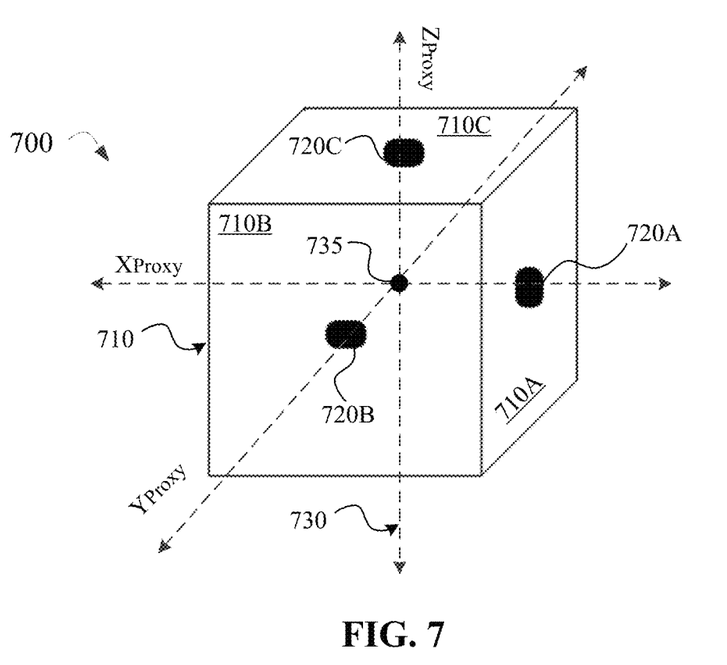
FIG. 7 illustrates an example of a tracked physical object, in accordance with some implementations.
Figure 8:
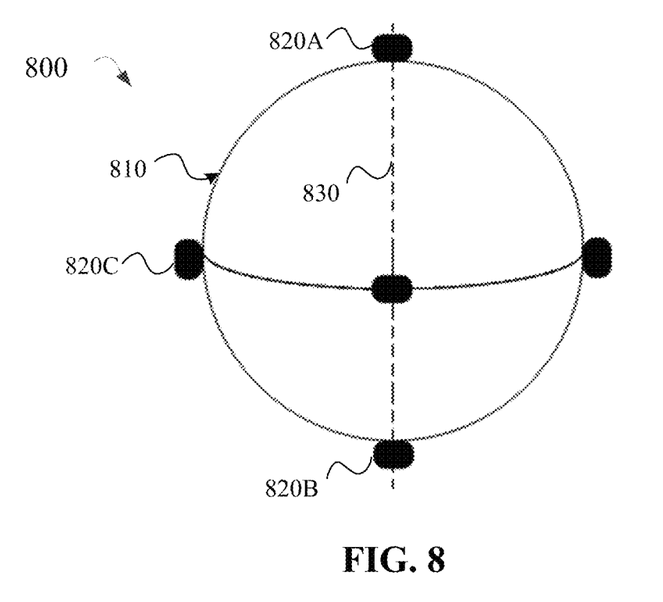
FIG. 8 illustrates another example of a tracked physical object, in accordance with some implementations.

FIGS. 7 and 8 provide two example configurations of a proxy device that is suitable for implementing proxy device 150, in accordance with implementations of the present disclosure. A proxy device in accordance with implementations of the present disclosure include a case defining peripheral boundaries of the proxy device and one or more input devices disposed on an externally facing surface of the proxy device. Each input device among the one or more input devices is configured to receive inputs representing requests corresponding to manipulations of a virtual object within an CGR environment. For example, an input device may receive an input representing a request to create a fixed alignment between the virtual object and a virtual representation of the proxy device and virtual objects within an CGR environment.

A form of the peripheral boundaries defined by the case may facilitate creating fixed alignments between a virtual representation of the proxy device and virtual objects within an CGR environment in specific increments. By way of example, the peripheral boundaries defined by case 710 in FIG. 7 form a cube. In defining the peripheral boundaries of proxy device 700 as a cube, case 710 facilitates creating fixed alignments between a virtual representation of proxy device 700 and virtual objects within an CGR environment in 90 degree increments.

In one implementation, the case is symmetrical with respect to one or more axes of a proxy device reference frame fixed at a center of the proxy device. In one implementation, the one or more user input devices include one or more physical input devices 720A-C/820A-C. The input devices may include: a physical input device (e.g., a button, joystick, switch, knob, dial, a touchpad, and the like). In one implementation, the one or more user input devices may include a simulated input device (e.g., a softkey, a virtual keyboard, and the like). In one implementation, the one or more user input devices are buttons configured to receive inputs representing a same request to associate movement of a virtual object with movement of a virtual representation of the proxy device.

Continuing with this example, content including a virtual object having a lower surface and an "up" directional vector defined normal to the lower surface may be presented on a display to a user interacting with proxy device 700. While the content is presented to the user, proxy device 700 may receive a first input corresponding to an interaction with input device 720B. In response to receiving the first input, an CGR presenting unit (e.g., CGR presenting unit 1044 of FIG. 10) may update the content to create a fixed alignment in which the "up" directional vector is parallel to a directional vector of the virtual representation that corresponds to a y-axis of proxy device reference frame 730.

Alternatively or subsequent to receiving the first input, proxy device 700 may receive a second input corresponding to an interaction with input device 720C while the content is presented to the user. In response to receiving the second input, the CGR presenting unit may update the content to create a fixed alignment in which the "up" directional vector is parallel to a directional vector of the virtual representation that corresponds to a z-axis of proxy device reference frame 730 fixed at a center 735 of proxy device 700.

In another example, proxy device 700 may receive an input corresponding to any of the input devices 720A-C while the content is presented to the user. In response to receiving the input, the CGR presenting unit may identify a closest match between each axis of a virtual representation of proxy device 700 and each axis of a virtual object within the CGR environment. By way of example, an x-axis of the virtual object may be in closer proximity to a directional vector corresponding to a z-axis of proxy device reference frame 730 than directional vectors corresponding to an x-axis or a y-axis of proxy device reference frame 730. In that instance, the CGR presenting unit may update the content to create a fixed alignment between the x-axis of the virtual object and the directional vector corresponding to the z-axis of proxy device reference frame 730. In one implementation, the CGR presenting unit may create that fixed alignment without regard to which input device was actuated to generate the input. In this implementation, the CGR presenting unit would create the fixed alignment between the x-axis of the virtual object and the directional vector corresponding to the z-axis of proxy device reference frame 730 even if the user actuated input device 720A or input device 720B, which intersect the x-axis and y-axis, respectively, of proxy device reference frame 730 to generate the input.

While the peripheral boundaries defined by case 710 in FIG. 7 form a cube, one skilled in the art will recognize that other implementations are not so limited. In accordance with some implementations, the peripheral boundaries of a proxy device defined by its case may assume other forms. For example, FIG. 8 illustrates the peripheral boundaries defined by case 810 as forming a sphere. As another example, the peripheral boundaries of a proxy device defined by its case may form a truncated cube.

In one implementation, each axis of a proxy device reference frame intersects with at least one of the one or more input devices disposed on an externally facing surface of a proxy device. For example, in FIG. 7, the x-axis, y-axis, and z-axis of proxy device frame 730 intersect with input device 720A, input device 720B, and input device 720C, respectively. In one implementation, each axis of a proxy device reference frame intersects with a plurality of input devices. For example, in FIG. 8, a first axis 830 of a proxy device reference frame corresponding to proxy device 800 intersects with input device 820A and input device 820B on diametrically opposing surface areas of case 810.

User manipulation of the proxy device may be facilitated by physical dimensions of the peripheral boundaries defined by the case. To that end, the case is adapted for manipulation by a grasping force applied by a hand of the user on diametrically opposing surface areas of the case and at another surface area of the case that is positioned orthogonal to the diametrically opposing surface areas. For example, in FIG. 8, case 810 is adapted for manipulation by a grasping force applied by a hand of a user on diametrically opposing surface areas of case 810 proximate to input devices 820A-820B and at another surface area (e.g., a surface area proximate to input device 820C) of case 810 that is positioned orthogonal to those diametrically opposing surface areas.

In one implementation, the one or more input devices include an input device that is configured to receive at least one input that is defined by a characteristic of an interaction with the input device. For example, if the input device is a touchpad, a characteristic of an interaction with the input device may include a duration of time in which an object remained in contact with the touchpad, an orientation of the object as it contacted the touchpad, an area of the touchpad in which contact between the object and the touchpad occurred, any movement or acceleration information associated with the object as it remained in contact with the touchpad, and the like.

Figure 9:
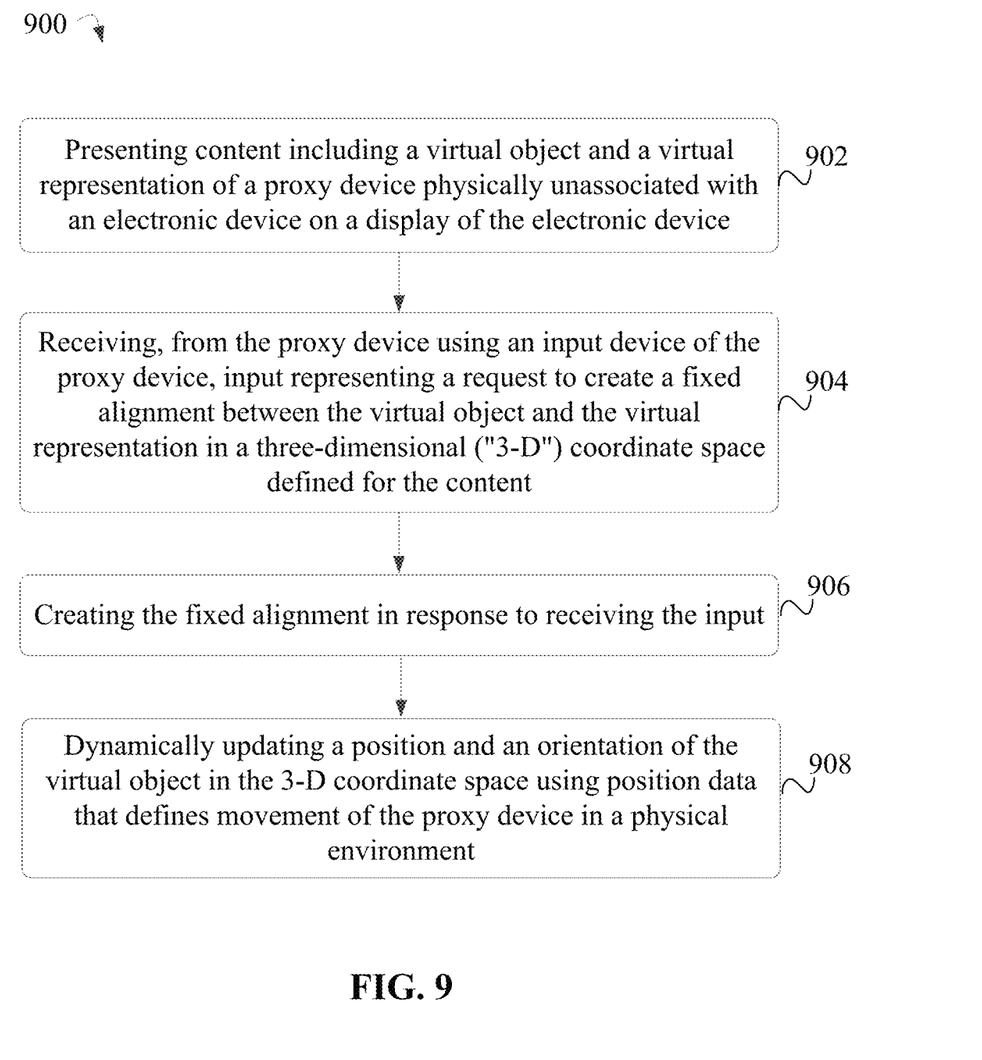
FIG. 9 is a flow-chart illustrating an example of a method of manipulating virtual objects using a tracked physical object while presenting content on a display of an electronic device.

FIG. 9 is a flow-chart illustrating an example of a method 900 of manipulating virtual objects using a tracked physical object while presenting content on a display of an electronic device. At block 902, method 900 includes presenting content including a virtual object and a virtual representation of a proxy device physically unassociated with the electronic device on the display. The proxy device including an input device disposed on an external facing surface of a case that defines peripheral boundaries of the proxy device. In one implementation, the case is symmetrical with respect to one or more axes of a proxy device reference frame fixed at a center of the proxy device. In one implementation, the case is adapted for manipulation by a grasping force applied by a hand of a user on diametrically opposing surface areas of the case and at another surface area of the case that positioned orthogonal to the diametrically opposing surface areas.

At block 904, method 900 includes receiving, from the proxy device using an input device, input representing a request to create a fixed alignment between the virtual object and the virtual representation in a 3-D coordinate space defined for the content. In one implementation, the input representing the request to create the fixed alignment is received from the proxy device when at least a subset of the virtual representation overlaps a location on the display occupied by the virtual object.

At block 906, method 900 includes creating the fixed alignment in response to receiving the input from the proxy device. In one implementation, creating the fixed alignment includes snapping a first surface of the virtual object to a portion of the virtual representation corresponding to a horizontal surface of the proxy device in the physical environment. In one implementation, source data for rendering the virtual object defines the first surface as a bottom surface of the virtual object. In one implementation, source data for rendering the virtual object defines attachment properties of the virtual object.

In one implementation, creating the fixed alignment includes updating the content presented on the display to include a visual feedback element associated with the virtual representation. In one implementation, the visual feedback element interacts with the virtual object on the display to gradually transition the virtual object from a pre-alignment pose to a post-alignment pose corresponding to the fixed alignment. In one implementation, the fixed alignment between the virtual object and the virtual representation is maintained for a duration of an interaction with the input device that generates the input. In one implementation, the fixed alignment between the virtual object and the virtual representation is maintained subsequent to a cessation of an interaction with the input device that generates the input.

At block 908, method 900 includes dynamically updating a pose (e.g., a position, an orientation, or a combination thereof) of the virtual object in the 3-D coordinate space using position data that defines movement of the proxy device in a physical environment. In one implementation, the position data defines translational movement and rotational movement of the proxy device in the physical environment.

In one implementation, method 900 further includes terminating the fixed alignment to release the virtual object from the virtual representation of proxy device. In one implementation, the fixed alignment is terminated in response to receiving another input representing a request to terminate the fixed alignment using an input device of the proxy device after creating the fixed alignment. In one implementation, the input representing the request to create the fixed alignment and the subsequent input representing the request to terminate the fixed alignment are received using the same input device of the proxy device. In one implementation, the input representing the request to create the fixed alignment and the subsequent input representing the request to terminate the fixed alignment are received using different input devices of the proxy device. In one implementation, the fixed alignment is terminated in response to a release of the input device used to receive the input representing the request to create the fixed alignment.

In one implementation, the position data is obtained using an image sensor, an optical source, an electromagnetic source, an electromagnetic sensor, an inertial measurement unit ("IMU"), or a combination thereof. In one implementation, at least one of the image sensor, the optical source, the electromagnetic source, and the electromagnetic sensor is a component of the proxy device. In one implementation, at least one of the image sensor, the optical source, the electromagnetic source, and the electromagnetic sensor is a component of the electronic device.

In one implementation, method 900 is performed by processing logic, including hardware, firmware, software, or a combination thereof. In one implementation, method 900 is performed by a processor executing code stored in a non-transitory computer-readable medium (e.g., a memory).

Figure 10:
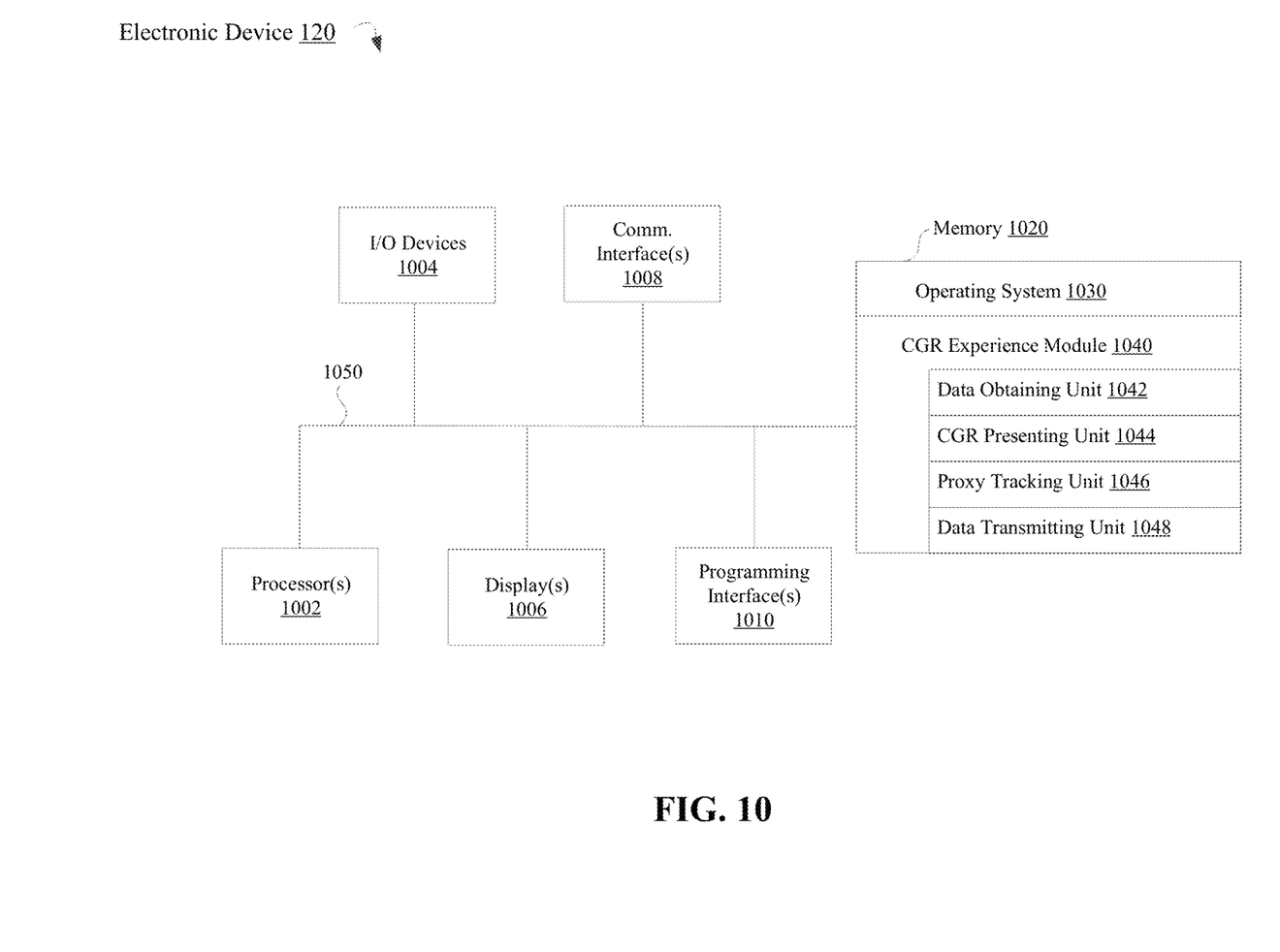
FIG. 10 is a block diagram of an example electronic device that is suitable for some implementations.

FIG. 10 is a block diagram of an example electronic device 120 that is suitable for implementing aspects of the present invention. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations electronic device 120 includes one or more processors 1002 (e.g., microprocessors, ASICs, FPGAs, GPUs, CPUs, processing cores, or the like), one or more I/O devices 1004, one or more displays 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1010, a memory 1020, and one or more communication buses 1050 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

The one or more I/O devices 1004 are configured to provide a human to machine interface exchanging commands, requests, information, data, and the like, between electronic device 120 and a user. The one or more I/O devices 1004 can include, but are not limited to, a keyboard, a pointing device, a microphone, a joystick, and the like. In some implementations, the one or more I/O devices 1004 include at least one of an inertial measurement unit ("IMU"), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In one implementation, the one or more I/O devices 1004 comprise an image sensor that is configured to obtain image data depicting a physical environment in which electronic device 120. Examples of suitable image sensors for effectuating image sensors of the one or more I/O devices 1004 may include one or more RGB camera (e.g., with a complimentary metal-oxide-semiconductor ("CMOS") image sensor or a charge-coupled device ("CCD") image sensor), monochrome camera, IR camera, event-based camera, or the like.

In some implementations, the one or more displays 1006 are configured to present content, as described above, to the user. In some implementations, the one or more displays 1006 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), or the like display types. In some implementations, the one or more displays 1006 correspond to diffractive, reflective, polarized, holographic, etc. waveguide displays.

In one implementation, the one or more displays 1006 includes a display device comprising a plurality of pixels. Each pixel among the plurality of pixels may be implemented using light-emitting diodes (LEDs), organic light-emitting diodes (OLEDs), plasma cells, liquid crystal display (LCD) components, and the like. In one implementation, the one or more displays 1006 are disposed on an inward facing surface of electronic device 120. In one implementation, the one or more displays 1006 are a see-through display through which a portion of the physical environment is visible.

In one implementation, the one or more displays 1006 include a stereoscopic image display for presenting left-eye and right-eye view points. In one implementation, the stereoscopic image display presents a stereoscopic subset of a 3-D representation of a scene corresponding to a physical environment (e.g., scene 105 of FIG. 1) in which electronic device 120 is located. In one implementation, the 3-D representation of the scene is reconstructed using light field images captured by an array of image sensors included in the one or more I/O devices 1004.

The one or more communication interfaces 1008 can include any device or group of devices suitable for establishing a wired or wireless data or telephone connection to one or more networks. Non-limiting examples of a network interface device include an Ethernet network adapter, a modem, or the like. A device can transmit messages as electronic or optical signals.

The one or more programming (e.g., I/O) interfaces 1010 are configured to communicatively couple the one or more I/O devices 1004 with other components of electronic device 120. As such, the one or more programming interfaces 1010 are capable of accepting commands or input from a user via the one or more I/O devices 1004 and transmitting the entered input to the one or more processors 1002.

The memory 1020 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example the memory 1020 may include high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. Instructions stored in the memory 1020 may be executed by the one or more processors 1002 to perform a variety of methods and operations, including the techniques of manipulating virtual objects using a tracked physical object while presenting content on a display of an electronic device that are described in greater detail above.

In some implementations, the memory 1020 or the non-transitory computer readable storage medium of the memory 1020 stores the following programs, modules and data structures, or a subset thereof including an optional operating system 1030 and an CGR environment module 1040. The operating system 1030 includes procedures for handling various basic system services and for performing hardware dependent tasks. In some implementations, the CGR environment module 1040 is configured to manage and coordinate one or more CGR environments for one or more users (e.g., a single CGR environment for one or more users, or multiple CGR environments for respective groups of one or more users). To that end, in various implementations, the CGR environment module 1040 includes a data obtaining unit 1042, a CGR presenting unit 1044, a proxy device tracking unit 1046, and a data transmitting unit 1048.

In some implementations, the data obtaining unit 1042 is configured to obtain data (e.g., position data, inputs from proxy devices, content from a graphics pipeline, etc.) from one or more computing devices external to electronic device 120. To that end, in various implementations, the data obtaining unit 1042 includes instructions or logic therefor, and heuristics and metadata therefor.

In some implementations, the CGR presenting unit 1044 is configured to present CGR content via the one or more displays 1006. To that end, in various implementations, the CGR presenting unit 1044 includes instructions or logic therefor, and heuristics and metadata therefor.

In some implementations, the proxy device tracking unit 1046 is configured to determine a pose (e.g., a position, an orientation, or a combination thereof) of a proxy device in a physical environment proximate to electronic device 120 based on position data received from the data obtaining unit 1042. To that end, in various implementations, the proxy device tracking unit 1046 includes instructions or logic therefor, and heuristics and metadata therefor.

In some implementations, the data transmitting unit 1048 is configured to transmit data (e.g., position data, inputs from proxy devices, requests for content updates from a graphics pipeline content, etc.) to one or more computing devices external to electronic device 120. To those ends, in various implementations, the data transmitting unit 1048 includes instructions or logic therefor, and heuristics and metadata therefor.

Although the data obtaining unit 1042, the CGR presenting unit 1044, the proxy device tracking unit 1046, and the data transmitting unit 1048 are shown as residing on a single device (e.g., electronic device 120), it should be understood that in other implementations, any combination of the data obtaining unit 1042, the CGR presenting unit 1044, the proxy device tracking unit 1046, and the data transmitting unit 1048 may be located in separate computing devices.

FIG. 10 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device with a display:
        presenting content including a virtual object and a virtual representation of a proxy device on the display, the proxy device including an input device on an external facing surface that defines a peripheral boundary of the proxy device;
        receiving, from the proxy device, input obtained using the input device, wherein the input represents a request to create a fixed alignment between the virtual object and the virtual representation in a three-dimensional ("3-D") coordinate space containing the content;
        creating the fixed alignment in response to receiving the input, wherein the fixed alignment is created based on determining that at least a subset of the virtual representation overlaps the virtual object when the input is received; and
        dynamically updating a position and an orientation of the virtual object in the 3-D coordinate space using position data that represents movement of the proxy device in a physical environment, wherein the position and orientation of the virtual object are updated to maintain the fixed alignment.

2. The method of claim 1, wherein the proxy device is symmetrical with respect to each axis of a proxy device reference frame fixed at a center of the proxy device.

3. The method of claim 1, wherein creating the fixed alignment includes:
    snapping a first surface of the virtual object to a portion of the virtual representation corresponding to a horizontal surface of the proxy device in the physical environment.

4. The method of claim 3, wherein source data for rendering the virtual object defines the first surface as a bottom surface of the virtual object.

5. The method of claim 1, wherein creating the fixed alignment includes:
snapping a second surface of the virtual object to a portion of the virtual representation corresponding to a vertical surface of the proxy device in the physical environment or snapping an axis of the virtual object to a directional vector of the virtual representation based on proximity.

6. The method of claim 1, wherein creating the fixed alignment includes:
updating the content presented on the display to include a visual feedback element associated with the virtual representation that interacts with the virtual object on the display to gradually transition the virtual object from a pre-alignment pose to a post-alignment pose corresponding to the fixed alignment.

7. The method of claim 1, wherein the proxy device is configured to be gripped by a hand of a user on diametrically opposing surface areas while contacting a palm of the hand at another surface area that is positioned orthogonal to the diametrically opposing surface areas.

8. A non-transitory computer-readable storage medium, storing instructions executable by a processor to perform operations comprising:
at an electronic device with a display:
presenting content including a virtual object and a virtual representation of a proxy device on the display, the proxy device including an input device on an external facing surface that defines a peripheral boundary of the proxy device, and the proxy device adapted for manipulation by a grasping force applied by a hand of a user on diametrically opposing surface areas and at another surface area positioned orthogonal to the diametrically opposing surface areas;
receiving, from the proxy device, an input obtained using the input device, wherein the input represents a request to create a fixed alignment between the virtual object and the virtual representation in a three-dimensional ("3-D") coordinate space containing the content;
creating the fixed alignment in response to receiving the input, wherein the fixed alignment is created based on determining that at least a subset of the virtual representation overlaps the virtual object when the input is received; and
dynamically updating a position and an orientation of the virtual object in the 3-D coordinate space using position data that represents movement of the proxy device in a physical environment.

9. The non-transitory computer-readable storage medium of claim 8, wherein the proxy device is symmetrical with respect to each axis of a proxy device reference frame fixed at a center of the proxy device.

10. The non-transitory computer-readable storage medium of claim 8, wherein source data for rendering the virtual object defines attachment properties of the virtual object.

11. The non-transitory computer-readable storage medium of claim 8, wherein the position data is obtained using an image sensor, an optical source, an electromagnetic source, an electromagnetic sensor, an inertial measurement unit ("IMU"), or a combination thereof.

12. The non-transitory computer-readable storage medium of claim 8, wherein the fixed alignment between the virtual object and the virtual representation is maintained for a duration of an interaction with the input device that generates the input.

13. The non-transitory computer-readable storage medium of claim 8, wherein the fixed alignment between the virtual object and the virtual representation is maintained subsequent to a cessation of an interaction with the input device that generates the input.

14. A proxy device comprising:
a case that defines peripheral boundaries of the proxy device, the case being symmetrical with respect to each axis of a proxy device reference frame fixed at a center of the proxy device; and
an input device on an external facing surface of the case that is configured to receive inputs representing requests for manipulations of a virtual object that is included in content via a virtual representation of the proxy device in the content, the content presented on a display of an electronic device,
wherein a fixed alignment between the virtual object and the virtual representation is created based on determining that at least a subset of the virtual representation overlaps the virtual object when input is received via the input device, wherein, based on the fixed alignment, movement of the proxy device in a physical environment translates into movement of the virtual representation in a three-dimensional ("3-D") coordinate space defined for the content.

15. The proxy device of claim 14, further comprising:
an inertial measurement unit ("IMU") configured to provide inertial data corresponding to movement of the proxy device relative to a global reference frame of the physical environment.

16. The proxy device of claim 14, further comprising:
a plurality of optical sources disposed on the external facing surface of the case at known locations relative to the proxy device reference frame, the plurality of optical sources configured to emit light.

17. The proxy device of claim 14, wherein the peripheral boundaries of the proxy device form a cube, a sphere, or a truncated cube.

18. The proxy device of claim 14, wherein the input device is one of a plurality of input devices disposed on external facing surfaces of the case, and wherein each axis of the proxy device reference frame intersects with at least one of the plurality of input devices.

19. The proxy device of claim 18, wherein the input devices are buttons configured to receive inputs representing a same request to associate movement of the virtual object with movement of the virtual representation of the proxy device.

* * * * *